United States Patent [19]
Koros et al.

[11] Patent Number: 6,120,577
[45] Date of Patent: Sep. 19, 2000

[54] TREATMENT OF STEEL MILL WASTE METAL OXIDES

[75] Inventors: Peter J. Koros, Pittsburgh; Jagjit S. Bajaj, Murrysville, both of Pa.; Valdis R. Daiga, Toledo; Vishwaprakash S. Hegde, Strongsville, both of Ohio

[73] Assignees: LTV Steel Company, Inc., Cleveland; Maumee Research and Engineering, Inc., Perrysburg, both of Ohio; USX Corporation, Pittsburgh, Pa.

[21] Appl. No.: 09/047,770
[22] Filed: Mar. 25, 1998
[51] Int. Cl.[7] .......................... C21B 11/08; C22B 19/04; C22B 13/06
[52] U.S. Cl. .................. 75/483; 75/504; 75/656; 75/695; 75/961
[58] Field of Search ............. 75/483, 656, 504, 75/695, 961

[56] References Cited

U.S. PATENT DOCUMENTS

| | | |
|---|---|---|
| 3,836,353 | 9/1974 | Holley . |
| 3,926,617 | 12/1975 | Beggs et al. . |
| 4,123,257 | 10/1978 | Fukuoka et al. .......................... 75/317 |
| 4,195,821 | 4/1980 | Beggs et al. . |
| 4,369,062 | 1/1983 | Strange ..................... 75/500 |
| 4,622,905 | 11/1986 | MacDougall et al. . |
| 4,636,127 | 1/1987 | Olano et al. . |
| 4,676,741 | 6/1987 | Pargeter . |
| 4,701,214 | 10/1987 | Kaneko et al. . |
| 4,780,135 | 10/1988 | Pargeter . |
| 4,835,847 | 6/1989 | Bishop et al. ............................ 75/504 |
| 5,186,741 | 2/1993 | Kotraba et al. .......................... 75/695 |
| 5,364,447 | 11/1994 | Phillip et al. ............................ 75/695 |
| 5,516,358 | 5/1996 | Pargeter et al. . |
| 5,601,631 | 2/1997 | Rinker et al. . |
| 5,730,775 | 3/1998 | Meissner et al. . |
| 5,782,957 | 7/1998 | Rinker et al. . |
| 5,865,875 | 2/1999 | Rinker et al. . |
| 5,873,925 | 2/1999 | Rinker et al. ............................ 75/436 |
| 5,912,403 | 6/1999 | Bilke ........................................ 75/773 |
| 5,922,261 | 7/1999 | Ford, Jr. ................................. 264/122 |
| 5,951,740 | 9/1999 | Sarma et al. ............................. 75/484 |
| 5,972,066 | 10/1999 | Lehtinen ............................... 75/10.63 |

FOREIGN PATENT DOCUMENTS 0 217 139  4/1987  European Pat. Off. .
97/45561  12/1997  WIPO .

OTHER PUBLICATIONS

Database WPI, Section Ch, Week 9209, *Derwent Publications Ltd.*, London, GB; Class M24, AN 92–071150 XP002107989 & SU 1 638 176 A, (Ferrous Metallurg Bardin), Mar. 30, 1991 *abstract*.

*Primary Examiner*—Jill Warden
*Assistant Examiner*—Tima McGuthry-Banks
*Attorney, Agent, or Firm*—Watts, Hoffmann, Fisher & Heinke, Co., LPA

[57] ABSTRACT

A process of recovering iron values and separating zinc oxides and other contaminants from steel mill waste metal oxides, such as blast furnace dust, BOF dust, mill scale and oily sludges, characterized by iron metallization levels up to 95% or more and zinc oxide removal in excess of 99%, and including the steps of blending the oxides with coke breeze in an amount sufficient to provide a total carbon content of 16% to 22%, the coke breeze having a particle size of 50% or more plus 60 mesh or larger, briquetting the blend to form briquettes having a thickness ranging from ½" to ¾", and firing the briquettes in a rotary hearth furnace to metallize the iron and evolve zinc and other oxide contaminants.

8 Claims, 1 Drawing Sheet

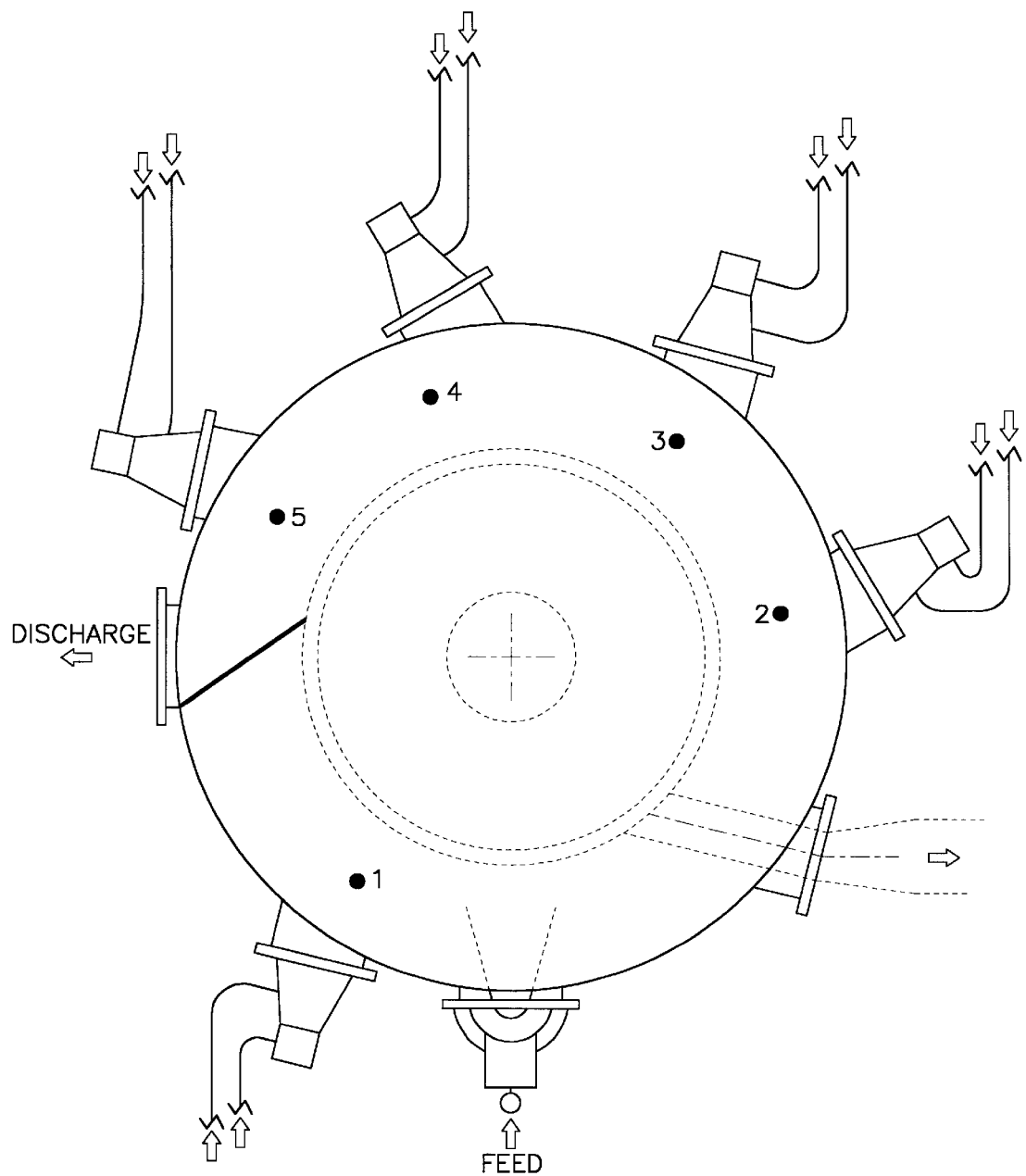

TREATMENT OF STEEL MILL WASTE METAL OXIDES

This invention relates generally to the treatment of steel mill waste metal oxides, and more particularly to an improved process of separating and recovering iron, zinc and lead from waste oxides such as blast furnace dust, BOF dust, sludge and mill scale.

BACKGROUND OF THE INVENTION

Various processes have been proposed in the past for treating waste oxides from the steel mill in order to recover iron values and separate contaminant constituents such as zinc and lead oxides and the like. One such prior art process is disclosed in U.S. Pat. No. 5,601,631. The process of this patent includes the steps of forming a dry mixture of metal oxide waste and a carbonaceous material, agglomerating the mixture, as by briquetting, to form green compacts, firing the compacts in a rotary hearth furnace at an effective hearth temperature of about 2100° F.–2450° F. for about five to twelve minutes. The carbonaceous material is one containing a high volatile matter content which is mobilized to bond the dry mixture and form the green compacts. In the preferred embodiment, the carbonaceous material is coal. As disclosed in the patent, metal oxides of iron, lead, cadmium and zinc are reduced at relatively low $CO/CO_2$ ratios of between 2–5, most preferably about 3. The patent claims over 99% removal of zinc, cadmium and lead oxide.

U.S. Pat. No. 4,780,135 discloses a method of processing waste metal oxides by combining the dust with carbon, such as coke breeze, coal dust, charcoal or any other suitable carbon source, and pelletizing the mixture. The pellets are fired in a rotary hearth furnace at temperatures ranging between 1100° F.–2000° F. for about eight to twenty minutes.

U.S. Pat. No. 3,836,353 discloses a method of recovering iron and oxide impurities from steel furnace dust in which the dust first is mixed with finally divided coke and then pelletized. The pellets are processed in a rotary hearth furnace through a drying zone (500° F.–600° F.), a heating zone (1500° F.–1600° F.), a zone heated to about 2000° F. where contaminants such as zinc are evaporized and removed, and a reoxidizing and hardening zone (2000° F.–2450° F.) for about seven to fifteen minutes.

As generally described above, the prior art processes of recovering iron and separating oxide impurities from steel mill waste products generally involve mixing the waste oxides with a carbonaceous material, agglomerating the mixture by pelletizing or briquetting to form green compacts, and firing the compacts in a rotary hearth furnace at temperatures up to about 2500° F. in order to metallize the iron values and volatilize the contaminant oxides such as zinc and lead. While some of these prior processes have found some acceptance, none have been completely successful because of certain difficulties addressed by the process of the present invention. For example, pelletizing requires wetting of the blend with up to about 12% moisture and then shaping into round pellets. Upon drying, the pellets develop a relatively tight skin which impedes fast outward movement of reaction gases. Unless predried and heated slowly, which are costly impediments to productivity, the pellets exfoliate. Large pellets of about ½ inch have been found to "pop" even when predried to less than 1% moisture due to build-up of excessive internal pressure resulting from contained oil, CO, etc. This disintegration of pellets results in a carry-over of iron oxide particles into the gas stream and into the bag house catch, thereby adversely affecting zinc quality and reducing the recoverable iron values for further steel making operations. The use of small pellets in an attempt to avoid disintegration results in multi-layer packing on the hearth which retards heat transfer and lowers the extent of metallization and zinc removal.

Binder aids, such as bentonite and the like, have been used to make pellets with sufficient green strength to withstand entry into the rotary hearth furnace. The use of bentonite has a disadvantage of introducing materials that promote melting and slagging of oxides in and on the pellets. More particularly, bentonite adds silicates and alkali metals to the already alkali oxide rich waste oxides, thereby lowering the temperature at which these materials melt and form a slag. The slagging of the pellets restrict the maximum operating temperature and, hence, the productivity of the furnace.

While briquettes are less prone to exfoliation than pellets and can achieve faster metallization, certain disadvantages have been experienced in their use. Conventionally made briquettes have exhibited slagging and a high degree of reoxidation in the microstructure. As in the case of pellets, slagging results from melting undesirable oxides at the temperatures needed to achieve optimum metallization. Slagging ties up iron oxide making it more difficult to reduce. Reoxidation decreases the degree of metallization.

In an effort to minimize carbon depletion in briquettes which results in reoxidization of the iron, it has been proposed to combine the waste oxides with coal prior to briquetting. The use of coal is not completely effective because it oxidizes rapidly under furnace conditions to result in a carbon depleted zone on the outside of the briquette. When carbon has been eliminated from the surface, reoxidation can begin even if metallization is not complete in the interior, since carbon in the interior will not prevent reoxidation at the surface. Further, the volatile material introduced into briquettes by coal can cause the briquettes to crack during firing.

SUMMARY OF THE INVENTION

An object of the present invention is to provide an improved process for treating steel mill waste oxides to separate and recover iron, zinc and lead values which minimizes the disadvantages of prior art practices discussed above.

In a preferred embodiment, the improved process of the invention comprises the steps of combining dry waste oxides and sludge to form a mixture which contains carbon, iron, zinc and lead values, adding particulate coke to said mixture in an amount sufficient to result in a total carbon content in a range of from about 16% to about 22% by weight, briquetting the mixture in the absence alkali metal binders, such as bentonite, to form green briquettes having a thickness ranging from about ½ inch to about ¾ inch, firing the green briquettes in a rotary hearth furnace at temperatures in excess of 2000° F. for up to about eighteen minutes to reduce iron oxides to elemental iron and evolve zinc and lead, removing the fired briquettes from the furnace for use in steel making operations, and collecting the evolved zinc and lead downstream from the rotary hearth furnace.

In particularly preferred embodiments, about 50% of the coke added to the mixture has a particle size of plus 60 mesh or larger, and the coke is added in an amount sufficient to raise the total carbon content of the mixture to about 18% by weight. The process is preferably carried out by firing the briquettes at temperatures in excess of 2300° F. for a period of time no greater than about fourteen minutes.

The process of the invention yields metallization levels up to 95% or more. Zinc removal is greater than 99% and lead removal is in excess of 95%. The zinc, lead and other oxide contaminants are exhausted from the rotary hearth furnace into a baghouse. The high level of zinc removal and the minimal transfer of iron oxide to the dust catch result in a zinc oxide rich product suitable for use in primary zinc plants. The zinc to iron ratio has been found well in excess of 10, and can be in excess of 70.

In carrying out the preferred practice of this invention, dry waste oxides, such as BOF dust, blast furnace dust, mill scale and the like are mixed with oily steel mill waste, such as mill scale contaminated with oil, in the manner described in co-pending application Ser. No. 08/646,832 filed on May 31, 1996 and entitled Method of Agglomerating Oil-Containing Steel Mill Waste, the disclosure of which is incorporated by reference. The waste oxides can be used in their existing state; no grinding to reduce the particle size is necessary. According to the present invention, coke breeze is incorporated into the mixture in an amount sufficient to raise the total carbon content to about 5% above that required to meet the stoichiometric requirements of the reducible oxides contained in the blend. The mixture of dry and oily waste oxides typically has a carbon content of around 13%. Accordingly, coke breeze is incorporated into the mixture in an amount sufficient to raise the carbon level content to a range of from about 16% to about 22% by weight and, more preferably, about 18% by weight. The coke breeze is sized so that about 96% passes through an 8 mesh screen and about 50% or more is plus 60 mesh or larger.

Binders are used to prepare the blended mixture for briquetting. The binders are characterized by the absence of significant alkali metal content. A typical waste oxide mixture contains about 0.45% $Na_2O$ plus $K_2O$. Tests have shown that the addition of as little as 1.5% of bentonite raises the alkali metal content to a level which results in observable slag formation in about ten minutes when briquettes are exposed to temperatures of about 2280° F. or higher. The slagging phenomenon limits achievable metallization because the iron oxides are diluted in the slag. In one example of the invention, the binders are molasses and hydrated lime which are blended into the mixture in amounts of 4 and 3%, respectively. Smaller amounts of binder which result in physically weaker green briquettes can be used, however.

Green briquettes formed from the mixed materials have a preferred thickness in the range of from about ½ inch to about ¾ inch with the most preferred thickness being around ½ inch to ⅝ inch. The other dimensions correspond to commercial briquette sizes. Briquettes having a thickness less than about ½ inch tend to pack on the hearth which adversely affects the rate and degree of metallization. Thicknesses larger than about ¾ inch may result in incomplete metallization.

The formed briquettes are charged into a rotary hearth furnace. For optimum metallization, the briquettes are charged onto the hearth in a layer having a thickness of one to one and one-half briquettes. The briquettes are introduced into a zone of the hearth that is maintained at a temperature about 1950° F. or higher. As the hearth rotates, the briquettes travel through a succession of zones maintained at increasing temperatures culminating in a final firing temperature of about 2400° F. or higher. The briquettes are heated in the furnace for about ten to fourteen minutes.

Control of the furnace atmosphere is important in order to achieve the desired degree of metallization. The ratio of CO to $CO_2$ should be a minimum of 2.0, and preferably higher.

It is believed that the direction of hearth movement should be counter current to the flow of hot gases for most of the time that the briquettes are in the furnace. In one rotary hearth furnace found satisfactory for carrying out the invention, there was some concurrent flow of hot gases for approximately 27 degrees of hearth rotation when the briquettes were first introduced into the furnace. Thereafter, the direction of gas movement was counter current to hearth rotation until the briquettes reached the maximum firing temperature and were discharged from the furnace. The hot gases discharged from the furnace chamber traveled into an afterburner zone where the oxidizable gases are completely combusted and the metallic zinc and lead in the gas phase are oxidized with air. The dust laden gases are cooled with air or water to a temperature above the dew point, but cold enough not to pose a hazard of damage to the baghouse installed to capture the solids carried by the gases.

When the process of the present invention is practiced in the preferred manner, the briquettes can be metallized by at least 93%, and, optimally, up to 95% or more, with reduction and removal of zinc and lead to the extent of 99.6%. The composition of the dust catch in the baghouse will contain less than 1.0% iron as an iron oxide, thereby providing a recoverable, useful zinc oxide by-product.

The use of coke breeze instead of coal to provide a briquetting mixture containing on the order of 18% carbon and the sizing of the coke breeze so that about 50% of the particles have a size of plus 60 mesh or larger are significant factors in achieving the results described above. The use of coke instead of coal reduces breakage of the briquettes due to fault lines created by volatile gases. Further, coke breeze ash is less prone to slagging in the briquettes. The addition coarse coke breeze particles ground to 50% plus 60 mesh or larger guards against reoxidation of the reduced iron. Even though the furnace gas is oxidizing to both carbon and metal, the coarse coke particles remaining in the surface zone of the briquettes will maintain a reducing condition with respect to the metal and thereby protect it against reoxidation. It was discovered that the use of coke breeze ground to minus 100 mesh is more likely to be oxidized in the furnace than plus 60 mesh material and leads to a coke depleted zone at the surface of the briquette. Once the thickness of the coke depleted zone is on the order of only 100–200 microns thick, reoxidation will begin even if metallization is not complete in the interior of the briquettes. Thus, the local presence of carbon at or near the surface of the briquettes has been found necessary to achieving high degrees of metallization without reoxidation.

Other features and advantages of the invention will be apparent from the following description of detailed examples.

BREIF DESCRIPTION OF THE DRAWING

The drawing is a schematic view of a rotary hearth furnace suitable for carrying out the process of this invention.

DESCRIPTION OF EXAMPLES

A test run was made with BOF dust, blast furnace dust, mill scale and iron oxide containing sludge from various sources in a steel mill. The dry waste oxides and sludge were mixed in the manner described in co-pending application Ser. No. 08/646,832. The blend contained at least 10% mill scale and had a size consisting of about 10% plus 8 mesh. The waste oxides were used in their existing state, i.e., without grinding. Coke breeze having a size of 96% minus 8 mesh and about 50% plus 60 mesh was added to the blend so that the carbon level was approximately 21%. Table 1 summarizes the resulting briquette feed composition.

The feed material was briquetted to produce briquettes having a size of about ½ in thickness×⅝ wide×⅞ in length which were introduced into a rotary hearth furnace as shown in the drawing. The temperature of the furnace was elevated through five zones designated 1 through 5 in the drawing from the charge zone to the discharge zone. The temperature profile was: 1965° to 1975° F. in the charge zone 1, 2311° to 2328° F. in the second zone 2, 2369° to 2394° F. in the third zone 3, 2418° to 2435° F. in the fourth zone 4, and 2388° to 2399° F. in the discharge zone 5. The total residence time in the furnace was 13.5 minutes. For the entire test, 95 pounds of briquettes were fed to the furnace and 53 pounds of processed briquettes were collected. Table 2 summarizes the briquette composition.

The dust collected by the baghouse was sampled. Table 3 summarizes the results.

Many variations and modifications of the invention will be apparent to those skilled in the art in light of the foregoing description and specific example. Therefore, it is to be understood that, within the scope of the appended claims, the invention can be practiced otherwise and as specifically described.

What is claimed:

1. A process of separating and recovering iron, zinc and lead from steel plant waste oxides, including blast furnace dust, BOF dust, sludge and mill scale, comprising the steps of:
   a) combining dry waste oxides and sludge to form a mixture which contains carbon and iron, zinc and lead values,
   b) adding particulate coke to said mixture so that the total carbon content is in the range of from about 16% to about 22% by weight,
   c) briquetting said mixture in the absence of alkali binders to form green briquettes having a thickness ranging from about ½ inch to about ¾ inch,
   d) firing said green briquettes in a rotary hearth furnace at temperatures in excess of 2000° F. to reduce iron oxides to elemental iron and evolve zinc and lead,
   e) removing the fired briquettes from the rotary hearth furnace for use in steel making operations, and
   f) collecting the evolved zinc and lead downstream from the rotary hearth furnace.

2. The process as claimed in claim 1 characterized in that the waste oxides are used without any size reduction.

3. The process as claimed in claim 1 wherein said particulate coke is added to said mixture so that the total carbon content is about 18% by weight.

TABLE 1

BRIQUETTE FEED

| % Total Fe | % Metallic Fe | % Metallization | % Zn | % C | % S | % CaO | % SiO$_2$ | % Cl | % F | % FeO | % Fe$_2$O$_3$ | % Al$_2$O$_3$ | % MgO | % Na$_2$O | % K$_2$O | % Pb |
|---|---|---|---|---|---|---|---|---|---|---|---|---|---|---|---|---|
| 43.56 | 2.22 | 5.10 | 2.34 | 20.99 | 0.241 | 6.13 | 2.66 | 0.241 | <0.005 | 16.82 | 40.47 | 0.92 | 2.12 | 0.23 | 0.19 | 0.046 |

TABLE 2

BRIQUETTE ANALYSIS

| Residence Time (Minutes) | % Total Fe | % Metallic Fe | % Metallization | % Zn | % C |
|---|---|---|---|---|---|
| 13.5 | 65.89–66.6 | 64.16–64.56 | 96.94–97.37 | 0.026–0.027 | 8.35–9.5 |

| Residence Time (Minutes) | % S | % CaO | % SiO$_2$ | % Cl | % F | % FeO |
|---|---|---|---|---|---|---|
| 13.5 | 0.408–0.41 | 11.84–11.98 | 4.83–4.85 | 0.023–0.034 | 0.058–0.064 | 0.85–1.42 |

| Residence Time (Minutes) | % Fe$_2$O$_3$ | % Al$_2$O$_3$ | % MgO | % Na$_2$O | % K$_2$O | % Pb |
|---|---|---|---|---|---|---|
| 13.5 | 1.21–1.38 | 1.51–1.52 | 3.96–3.97 | 0.21–0.22 | 0.11 | <0.004 |

TABLE 3

BAGHOUSE DUST ANALYSIS

| Total Charge to RHF (Lbs) | Dust Collected (Lbs) | % Total Fe | % Metallic Fe | % Zn | % C |
|---|---|---|---|---|---|
| 95 | 2.27 | 0.69 | 0.22 | 65.00 | 1.05 |
| % S | % CaO | % SiO$_2$ | % Cl | % F | % FeO |
| 0.81 | 0.14 | <0.10 | 5.28 | 0.19 | 0.14 |
| % Fe$_2$O$_3$ | % Al$_2$O$_3$ | % MgO | % Na$_2$O | % K$_2$O | % Pb |
| 0.52 | 1.8 | 0.78 | 1.63 | 3.09 | 2.3 |

4. The process as claimed in claim 1 wherein a binder is added to said mixture prior to said briquetting step, said binder being a combination of molasses and hydrated lime.

5. The process as claimed in claim 1 wherein said green briquettes are fired at temperatures in excess of 2300° F.

6. The process as claimed in claim 1 or claim 5 wherein the time of firing said briquettes is no greater than about 14 minutes.

7. A process of separating and recovering iron, zinc and lead from steel plant waste oxides, including blast furnace dust, BOF dust, sludge and mill scale, comprising the steps of:
   a) combining dry waste oxides and sludge to form a mixture which contains carbon and iron, zinc and lead values,
   b) adding particulate coke to said mixture so that the total carbon content is in the range of from about 16% to about 22% by weight, about 50% of said particulate coke having a particle size of plus 60 mesh or larger, c) briquetting said mixture in the absence of alkali binders to form green briquettes having a thickness ranging from about ½ inch to about ¾ inch, d) firing said green briquettes in a rotary hearth furnace at temperatures in excess of 2000° F. to reduce iron oxides to elemental iron and evolve zinc and lead, e) removing the fired briquettes from the rotary hearth furnace for use in steel making operations, and f) collecting the evolved zinc and lead downstream from the rotary hearth furnace.

8. The process as claimed in claim 7 wherein said particulate coke is added to said mixture so that the total carbon content is about 18% by weight.

* * * * *